United States Patent
Yoon

(10) Patent No.: US 12,407,280 B2
(45) Date of Patent: Sep. 2, 2025

(54) MOTOR DRIVER AND METHOD OF DRIVING MOTOR

(71) Applicant: LX SEMICON CO., LTD., Daejeon (KR)

(72) Inventor: Jang Hyun Yoon, Daejeon (KR)

(73) Assignee: LX Semicon Co., Ltd., Daejeon (KR)

( * ) Notice: Subject to any disclaimer, the term of this patent is extended or adjusted under 35 U.S.C. 154(b) by 81 days.

(21) Appl. No.: 18/232,647

(22) Filed: Aug. 10, 2023

(65) Prior Publication Data
US 2024/0056005 A1 Feb. 15, 2024

(30) Foreign Application Priority Data

Aug. 10, 2022 (KR) .......................... 10-2022-0100034

(51) Int. Cl.
*H02P 6/22* (2006.01)
*H02P 6/15* (2016.01)

(52) U.S. Cl.
CPC ..................... *H02P 6/157* (2016.02)

(58) Field of Classification Search
CPC ........ H02P 6/157; H02P 6/182; H02P 25/022; H02P 27/085; H02P 2207/05; H02P 23/0004; H02P 23/14; H02P 25/03
See application file for complete search history.

(56) References Cited

U.S. PATENT DOCUMENTS

| | | |
|---|---|---|
| 2013/0033212 A1 | 2/2013 | Hong |
| 2014/0265964 A1 | 9/2014 | Yersin |
| 2020/0127587 A1* | 4/2020 | Roemmelmayer ....... H02P 6/26 |
| 2021/0044226 A1 | 2/2021 | Tsai |

FOREIGN PATENT DOCUMENTS

| | | |
|---|---|---|
| EP | 3247036 A1 | 11/2017 |
| EP | 3540933 A1 | 9/2019 |

OTHER PUBLICATIONS

Extended European Search Report dated Jan. 17, 2024, for European Application No. 23190751.0; 8 pages.

* cited by examiner

*Primary Examiner* — Muhammad S Islam
(74) *Attorney, Agent, or Firm* — Greenberg Traurig, LLP; Allen Kim

(57) ABSTRACT

A motor driver includes an analog-to-digital converter (ADC) which, when a voltage sensing signal detected at a phase voltage of a specific coil in a floating period is input, samples the input voltage sensing signal at a sampling point and converts the input voltage sensing signal into digital voltage sampling data and a back electromotive force voltage determination unit which determines a back electromotive force voltage of the specific coil on the basis of a plurality of pieces of the digital voltage sampling data input for N periods.

17 Claims, 6 Drawing Sheets

MOTOR DRIVER AND METHOD OF DRIVING MOTOR

CROSS-REFERENCE TO RELATED APPLICATIONS

This application claims priority to and the benefit of Korean Patent Application No. 10-2022-0100034 filed in the Korean Intellectual Property Office on Aug. 10, 2022, the entire contents of which are incorporated herein by reference.

BACKGROUND

Field of the Invention

The present disclosure relates to a motor driver and a method of driving a motor.

Discussion of the Related Art

Recently, brushless direct current (BLDC) motors that do not use commutation brushes and thus have high energy efficiency have been used in various electronic devices including household appliances such as washing machines and refrigerators.

A BLDC motor may perform electronic commutation to change a current direction of a current flowing through a coil of an armature and may generate a continuously rotating magnetic field to rotate a rotor when a position of the rotor matches a commutation time point.

In the BLDC motor, when a rotor starts to rotate, a coil of the rotor becomes one power generator to generate a voltage, and the induced voltage generated in this case is referred to as a back electromotive force voltage. A BLDC motor system may detect the back electromotive force voltage and control the BLDC motor to be driven using the detected back electromotive force voltage.

In conventional BLDC motor systems, a back electromotive force voltage detection circuit for detecting a back electromotive force voltage is complex. The back electromotive force voltage detection circuit included in the conventional BLDC motor system has problems that, as a driving speed of the BLDC motor increases, power consumption increases, and it is difficult to detect the back electromotive force voltage at a high driving speed.

SUMMARY

The present disclosure is directed to providing a motor driver in which a circuit for detecting a back electromotive force voltage is simple and a method of driving a motor.

In addition, the present disclosure is directed to providing a motor driver and a method of driving a motor which are capable of accurately detecting a back electromotive force voltage even when a driving speed of a brushless direct current (BLDC) motor increases.

In addition, the present disclosure is directed to providing a motor driver and a method of driving a motor which are capable of minimizing a torque ripple.

A motor driver according to one aspect of the present disclosure includes an analog-to-digital converter (ADC) which, when a voltage sensing signal detected at a phase voltage of a specific coil in a floating period is input, samples the input voltage sensing signal at a sampling point and converts the input voltage sensing signal into digital voltage sampling data and a back electromotive force voltage determination unit which determines a back electromotive force voltage of the specific coil on the basis of a plurality of pieces of the digital voltage sampling data input for N periods.

A method of driving a motor according to another aspect of the present disclosure includes floating any one specific coil among three phase coils, converting, when a voltage sensing signal detected at a phase voltage of the specific coil in a floating period is input, the input voltage sensing signal into digital voltage sampling data by sampling the input voltage sensing signal and determining a back electromotive force voltage of the specific coil on the basis of a plurality of pieces of the digital voltage sampling data input for N periods.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain the principle of the disclosure. In the drawings.

DETAILED DESCRIPTION OF THE DISCLOSURE

Figure 1:
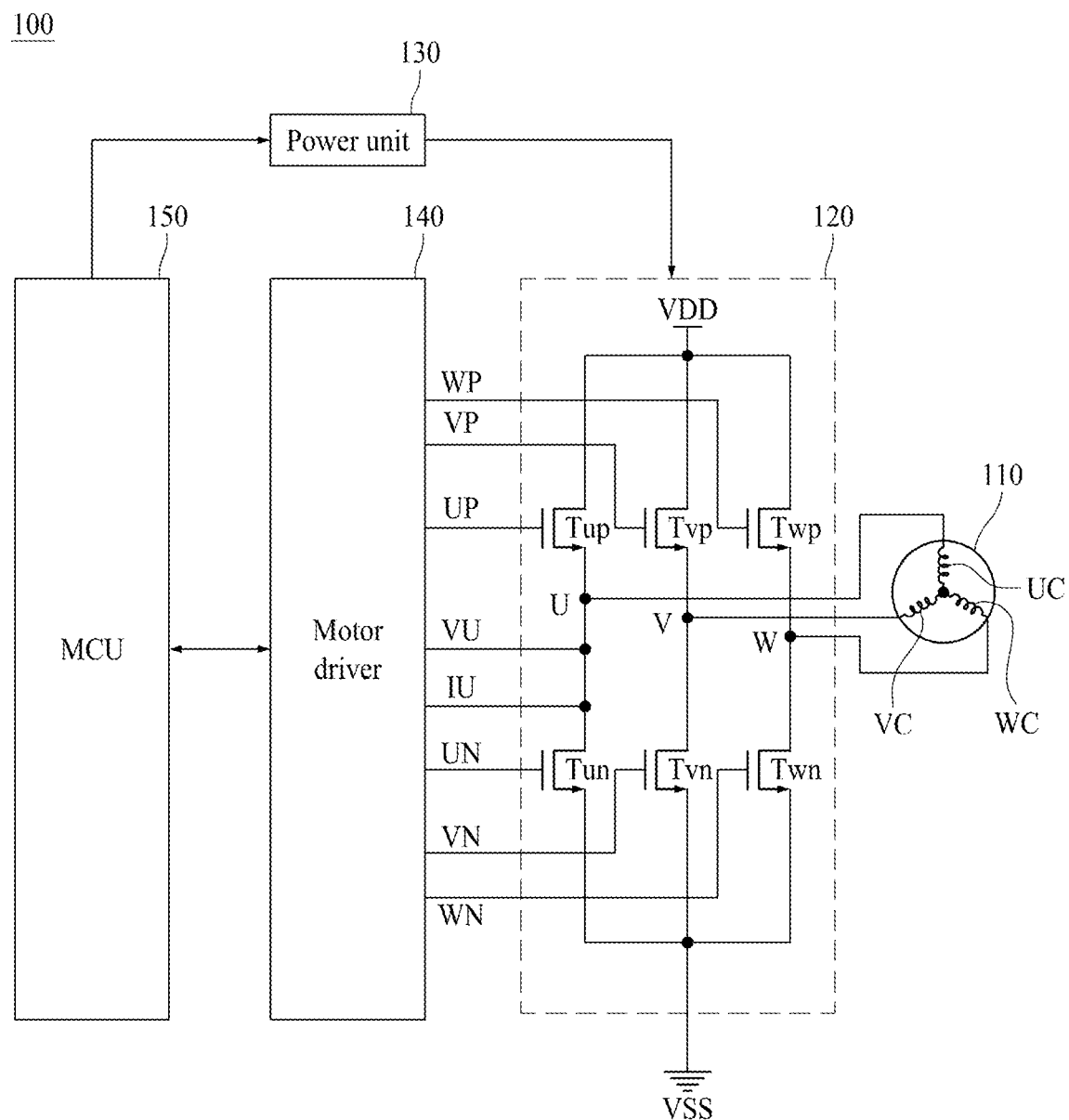
FIG. 1 is a view illustrating a configuration of a brushless direct current (BLDC) motor driving system according to one embodiment of the present disclosure.

Like reference numerals refer to actually like elements throughout the specification. In the following description, detailed description of components which are not related to core components of the present disclosure and components and functions which are known in the art of the present disclosure may be omitted. Meanings of terms described in this specification should be understood as follows.

Advantages and features of the present disclosure and methods of achieving the same will become apparent with reference to the accompanying drawings and the following detailed embodiments. However, the present disclosure is not limited to the embodiments to be disclosed below but may be implemented in various different forms, the embodiments are provided so that the present disclosure is completely implemented and provided to fully explain the scope of the present disclosure for those skilled in the art, and the scope of the present disclosure is defined by the appended claims.

Like reference numerals refer to like elements throughout the specification. In addition, in the description of the present disclosure, certain detailed descriptions of the related art are omitted when they are deemed to unnecessarily obscure the gist of the disclosure.

When terms "comprise," "include," have," "be formed of," and the like are used in the present specification, other elements may be added thereto unless "only" is used. A case in which a component is expressed in a singular form includes a case in which the component is provided as a plurality of components unless otherwise explicitly stated.

In the case of time-related description, for example, a case in which temporal parts are described with "after," "before," or the like may include a case in which the temporal parts are not sequential unless the term such as "immediately" or "directly" is used.

Although terms such as "first," "second," and the like may be used for describing various elements, the elements are not limited by the terms. The terms are only used to distinguish one element from another element. Accordingly, a first element mentioned below may also be a second element in a technical spirit of the present disclosure.

The term "at least one" should be understood to include all possible combinations from one or more related items. For example, "at least one of a first item, a second item, and a third item" may mean not only the first item, the second item, or the third item, but also all possible combinations of two or more items among the first item, second item, and the third item.

Features of various embodiments of the present disclosure may be partially or entirely coupled or combined and driven in cooperation in various technical ways, and the embodiments may also be implemented independently of each other or implemented together in conjunction with each other.

Hereinafter, embodiments of the present specification will be described in detail with reference to the accompanying drawings.

FIG. 1 is a view illustrating a configuration of a brushless direct current (BLDC) motor driving system according to one embodiment of the present disclosure.

Referring to FIG. 1, a sensorless BLDC motor driving system 100 according to one embodiment may include a BLDC motor 110, an inverter 120, a power unit 130, a motor driver 140, and a microcontroller unit (MCU) 150.

The BLDC motor 110 may include a stator including three phase coils UC, VC, and WC having different phases and a rotor using a permanent magnet, but the rotor is omitted in FIG. 1. The BLDC motor 110 may not include a Hall sensor.

The stator of the BLDC motor 110 may include a first coil UC having a U-phase (first phase), a second coil VC having a V-phase (second phase), and a third coil WC having a W-phase (third phase).

The BLDC motor 110 may be driven by driving signals supplied to the three phase coils UC, VC, and WC from the inverter 120. In the BLDC motor 110, a current may flow to a desired coil among the first to third coils UC, VC, and WC according to a position of the rotor to generate a magnetic force, and the generated magnetic force can rotate the rotor of the BLDC motor 110. For example, in the BLDC motor 110, according to the driving signals, a current may flow in the first coil UC in a positive (+) direction, a current may not flow in the second coil VC, and a current may flow in the third coil WC in a negative (—) direction. In this case, in the BLDC motor 110, the first coil UC becomes an N-pole to pull an S-pole of the rotor formed of the permanent magnet, and the third coil WC becomes an S-pole to push the S-pole of the rotor to rotate the rotor.

The inverter 120 may be operated by control of the motor driver 140, and may supply a first power voltage VDD or second power voltage VSS to each of the three phase coils UC, VC, and WC of the BLDC motor 110 through first to third nodes U, V, and W. The first power voltage VDD may be a high power voltage, and the second power voltage VSS may be a low power voltage.

Also, the inverter 120 may not supply the first and second power voltages VDD and VSS to any one specific coil among the three phase coils UC, VC, and WC to float the specific coil according to control of the motor driver 140.

The inverter 120 may receive the first power voltage VDD and the second power voltage VSS from the power unit 130. The inverter 120 may receive 1-1 and 1-2 coil control signals UP and UN, 2-1 and 2-2 coil control signals VP and VN, and 3-1 and 3-2 coil control signals WP and WN from the motor driver 140. The coil control signals UP, UN, VP, VN, WP, and WN supplied from the motor driver 140 may be pulse with modulation (PWM) signals.

The inverter 120 may include a first driving unit which drives the first coil UC of the BLDC motor 110, and the first driving unit may include a first pull-up transistor Tup and a first pull-down transistor Tun which are connected in series between a supply line of the first power voltage VDD and a supply line of the second power voltage VSS. A connection node between the first pull-up transistor Tup and the first pull-down transistor Tun may be connected to the first coil UC through the first node U.

The first pull-up transistor Tup may be turned on in a period in which the 1-1 coil control signal UP supplied from the motor driver 140 corresponds to a gate-on voltage to apply the first power voltage VDD to the first coil UC through first node U. The first pull-down transistor Tun may be turned on in a period in which the 1-2 coil control signal UN supplied from the motor driver 140 corresponds to a gate-on voltage to supply the second power voltage VSS to the first coil UC through the first node U.

Meanwhile, when both of the 1-1 and 1-2 coil control signals UP and UN supplied from the motor driver 140 correspond to gate-off voltages, both the first pull-up transistor Tup and the first pull-down transistor Tun may be turned off, and thus the first node U and the first coil UC may be floated.

The inverter 120 may include a second driving unit which drives the second coil VC of the sensorless BLDC motor 110, and the second driving unit may include a second pull-up transistor Tvp and a second pull-down transistor Tvn which are connected in series between a supply line of the first power voltage VDD and a supply line of the second power voltage VSS. A connection node between the second pull-up transistor Tvp and the second pull-down transistor Tvn may be connected to the second coil VC through the second node V.

The second pull-up transistor Tvp may be turned on in a period in which the 2-1 coil control signal VP supplied from the motor driver 140 corresponds to a gate-on voltage to apply the first power voltage VDD to the second coil VC through the second node V. The second pull-down transistor Tvn may be turned on in a period in which the 2-2 coil control signal VN supplied from the motor driver 140 corresponds to a gate-on voltage to apply the second power voltage VSS to the second coil VC through the second node V.

Meanwhile, when both of the 2-1 and 2-2 coil control signals VP and VN supplied from the motor driver 140 correspond to gate-off voltages, both the second pull-up transistor Tvp and the second pull-down transistor Tvn may be turned off, and thus the second node V and the second coil VC may be floated.

The inverter 120 may include a third driving unit which drives the third coil WC of the sensorless BLDC motor 110, and the third driving unit may include a third pull-up transistor Twp and a third pull-down transistor Twn which are connected in series between a supply line of the first power voltage VDD and a supply line of the second power voltage VSS. A connection node between the third pull-up transistor Twp and the third pull-down transistor Twn may be connected to the third coil WC through the third node W.

The third pull-up transistor Twp may be turned on in a period in which the 3-1 coil control signal WP supplied from the motor driver 140 corresponds to a gate-on voltage to apply the first power voltage VDD to the third coil WC through the third node W. The third pull-down transistor Twn may be turned on in a period in which the 3-2 coil control signal WN supplied from the motor driver 140 corresponds to a gate-on voltage to apply the second power voltage VSS to the third coil WC through the third node W.

Meanwhile, when both of the 3-1 and 3-2 coil control signals WP and WN supplied from the motor driver 140 correspond to gate-off voltages, both the third pull-up transistor Twp and the third pull-down transistor Twn may be turned off, and thus both the third node W and the third coil WC may be floated.

The motor driver 140 may control a speed of the BLDC motor 110 by adjusting a PWM duty of each of the coil control signals UP, UN, VP, VN, WP, and WN. Specifically, the motor driver 140 may receive a target PWM duty corresponding to a target speed from the MCU 150. The motor driver 140 may control the speed of the BLDC motor 110 on the basis of the target PWM duty.

The motor driver 140 may generate PWM signals each having the target PWM duty as the coil control signals UP, UN, VP, VN, WP, and WN and output the PWM signals to the inverter 120. The BLDC motor 110 is driven according to the driving signals supplied to the three phase coils UC, VC, and WC from the inverter 120, and a difference between the target speed and the driving speed may occur according to an external load, efficiency of the BLDC motor, and torque performance. In this case, the motor driver 140 may increase or decrease the driving speed of the BLDC motor 110 by increasing or decreasing the PWM duty based on the target PWM duty.

Meanwhile, the motor driver 140 may control the BLDC motor 110 using a relative positional relationship between a back electromotive force voltage and a driving current. As an example, in order to improve driving efficiency of the BLDC motor 110, the motor driver 140 may control a phase of the back electromotive force voltage to match a phase of the driving current. As another example, in order to increase the driving speed of the BLDC motor 110, the motor driver 140 may control the phase of the driving current to be earlier than the phase of the back electromotive force voltage.

In order to control the BLDC motor 110, the motor driver 140 may include a circuit for detecting the back electromotive force voltage and the driving current of the BLDC motor 110. The circuit for detecting the back electromotive force voltage and the driving current will be described in detail with reference to FIGS. 2 to 7.

The MCU 150 may control the driving speed of the BLDC motor 110 by adjusting the target PWM duty of the motor driver 140 or the driving voltage VDD of the power unit 130. The MCU 150 may be defined as a controller.

The MCU 150 may determine a target speed of the BLDC motor 200 and provide the target PWM duty corresponding to the determined target speed to the motor driver 140.

Figure 2:
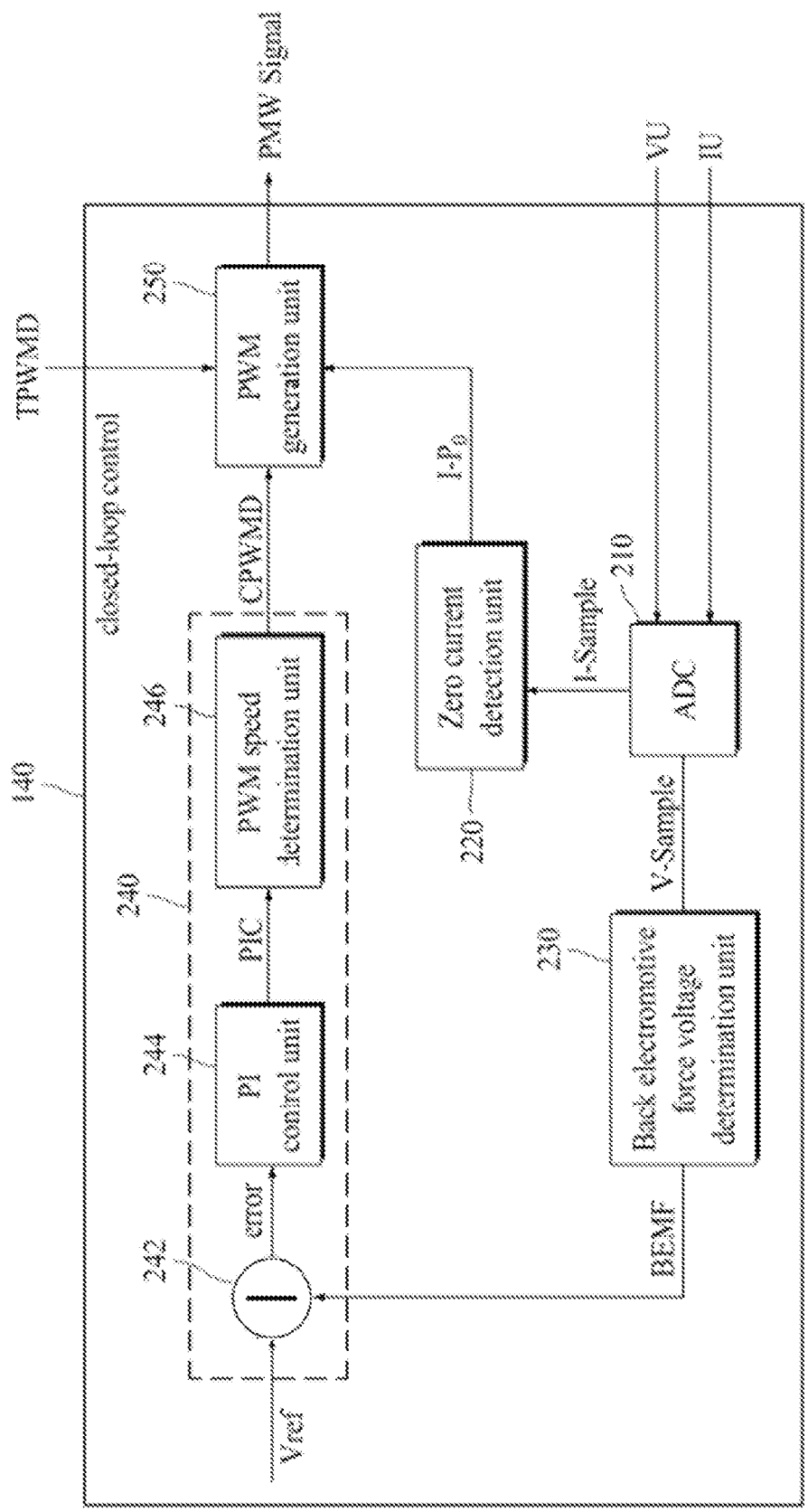
FIG. 2 is a block diagram illustrating a configuration of a motor driver illustrated in FIG. 1.
Figure 3:
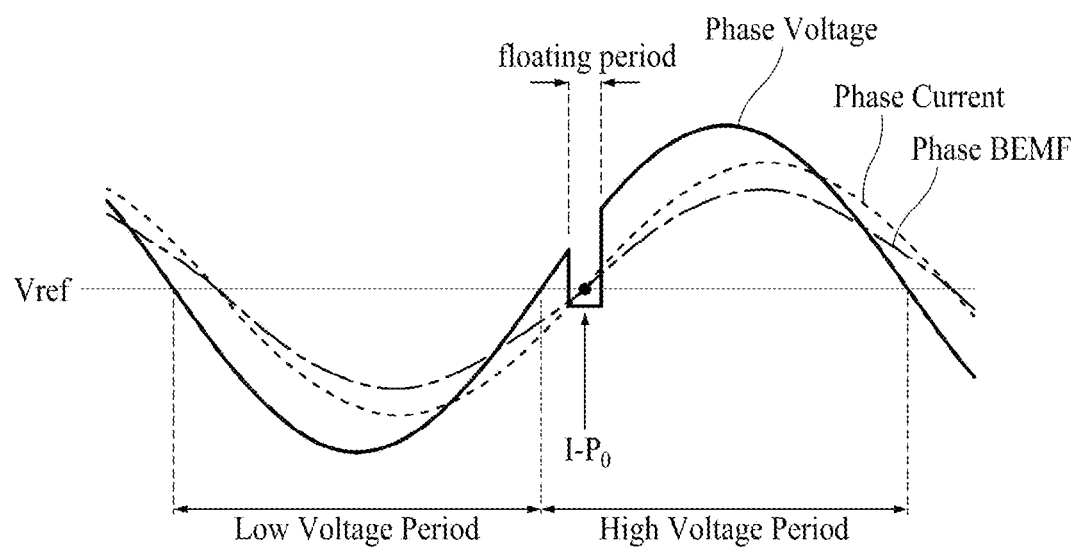
FIG. 3 is a graph which shows one example of a phase voltage, a phase current, and a back electromotive force voltage of a specific coil and in which a floating period is present.
Figure 4:
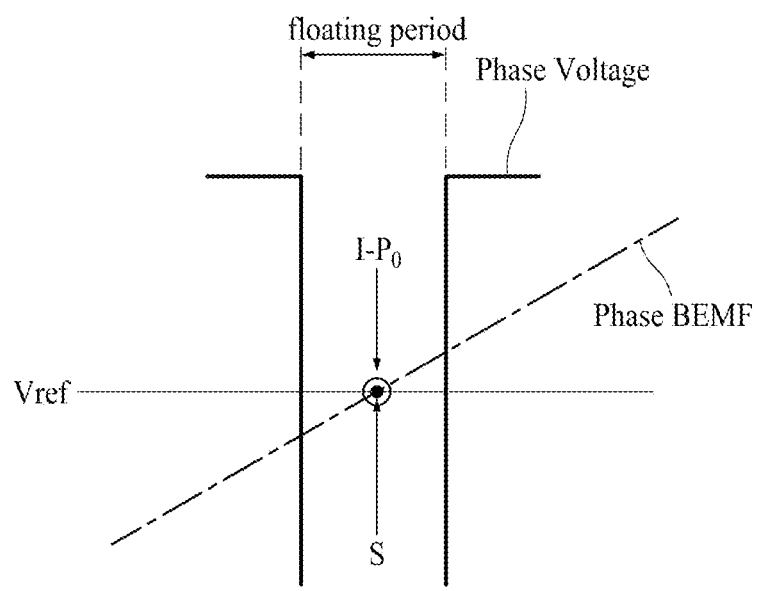
FIG. 4 is a view illustrating one example in which a plurality of pieces of digital voltage sampling data are obtained in the floating period.
Figure 5:
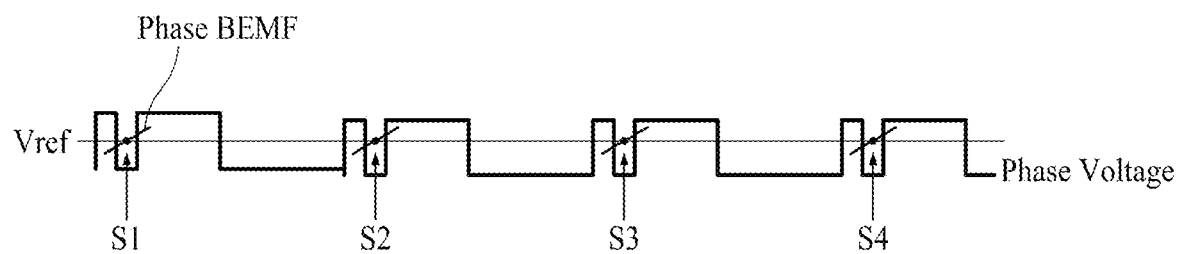
FIG. 5 is a view illustrating one example in which a plurality of pieces of digital voltage sampling data are obtained for N periods.
Figure 6:
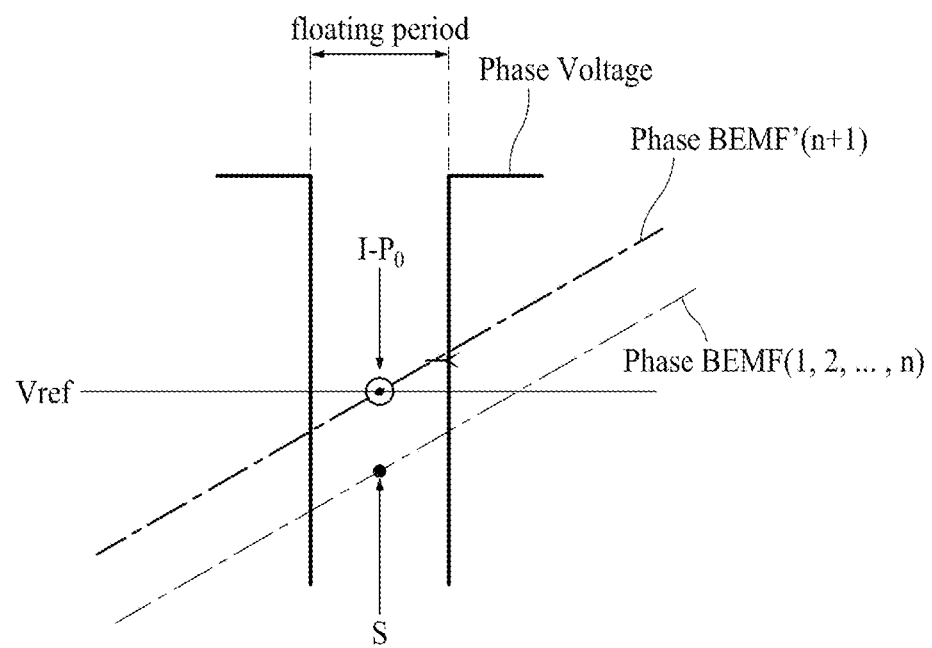
FIG. 6 is a view for describing one example in which an error is compensated for when a detected back electromotive force voltage is lower than a reference voltage.
Figure 7:
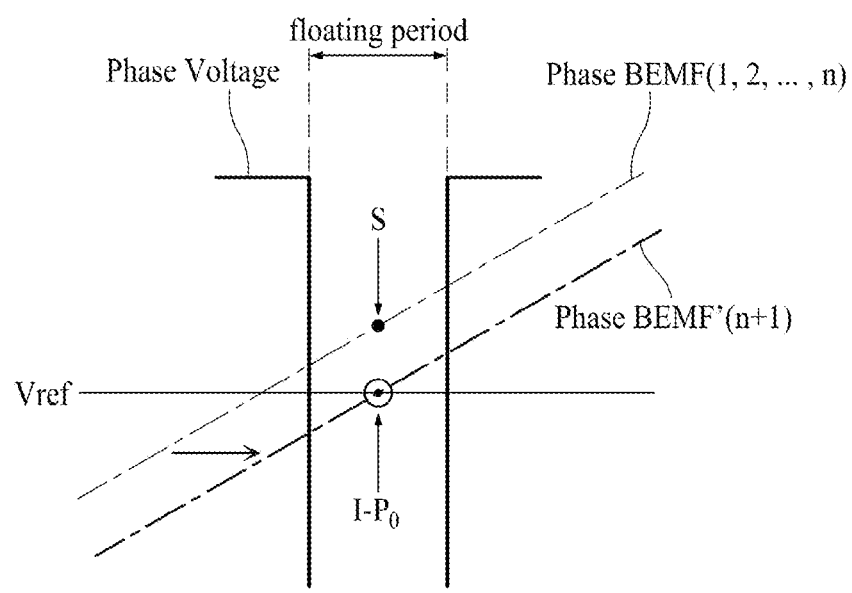
FIG. 7 is a view for describing one example in which an error is compensated for when a detected back electromotive force voltage is higher than the reference voltage.

FIG. 2 is a block diagram illustrating a configuration of a motor driver illustrated in FIG. 1, and FIG. 3 is a graph which shows one example of a phase voltage, a phase current, and a back electromotive force voltage of a specific coil and in which a floating period is present. FIG. 4 is a view illustrating one example in which a plurality of pieces of digital voltage sampling data are obtained in the floating period, and FIG. 5 is a view illustrating one example in which a plurality of pieces of digital voltage sampling data are obtained for N periods. FIG. 6 is a view for describing one example in which an error is compensated for when a detected back electromotive force voltage is lower than a reference voltage, and FIG. 7 is a view for describing one example in which an error is compensated for when a detected back electromotive force voltage is higher than the reference voltage.

Referring to FIG. 2, a motor driver 140 includes an analog-to-digital converter (ADC) 210 and a back electromotive force voltage determination unit 230 in order to detect a back electromotive force voltage. In one embodiment, the motor driver 140 may further include a zero current detection unit 220 in order to determine a floating period. In addition, in one embodiment, the motor driver 140 may further include a speed control unit 240 and a pulse width modulation (PWM) generation unit 250 in order to control a brushless direct current (BLDC) motor 110 using the detected back electromotive force voltage.

The ADC 210 may convert a voltage sensing signal detected at one phase voltage VU of a specific coil among the three phase coils UC, VC, and WC in a floating period into digital voltage sampling data and output the digital voltage sampling data.

Specifically, when any one specific coil is floated among the three phase coils UC, VC, and WC, the ADC 210 may receive the voltage sensing signal detected at the phase voltage VU of the specific coil from the inverter 120 through a specific node among the first to third nodes U, V, and W.

The motor driver 140 may float any one specific coil among the three phase coils UC, VC, and WC by outputting both control signals for the specific coil among coil control signals UP, UN, VP, VN, WP, and WN output to the inverter 120 to correspond to gate-off voltages. For example, the motor driver 140 may float the first node U and the first coil UC by outputting both 1-1 and 1-2 coil control signals UP and UN corresponding to gate-off voltages. The ADC 210 may receive the voltage sensing signal detected at the phase voltage VU of the floated first coil UC through the first node U.

Referring to FIG. 3, a floating period may have a phase range in which a phase current zero phase I-$P_0$ at which a phase current of the specific coil is zero is present.

In one embodiment, the motor driver 140 may set a preset phase range to the floating period. As an example, the motor driver 140 may set a phase range in which a phase of the phase voltage of the specific coil is 30° to the floating period. Generally, since the phase current is zero when the phase of the phase voltage of the specific coil is 30°, the motor driver 140 may set the phase range in which the phase of the phase voltage of the specific coil is 30° to the floating period and float the specific coil in the floating period.

In another embodiment, the motor driver 140 may detect the phase current zero phase I-$P_0$ at which the phase current of the specific coil is zero and set the phase range in which the detected phase current zero phase I-$P_0$ is present to the floating period.

Specifically, the ADC 210 may receive a current sensing signal detected at a current IU of any one specific coil among the three phase coils UC, VC, and WC from the inverter 120 through any one of the first to third nodes U, V, and W. For example, the ADC 210 may receive the current sensing signal detected at the phase current IU of the first coil UC through the first node U.

The ADC 210 may convert the current sensing signal detected at the phase current IU into digital current sampling data I-sample and output the digital current sampling data I-sample. The ADC 210 may sample the current sensing signal detected at the phase current IU at each of a plurality of sampling points and convert the current sensing signal into the digital current sampling data I-sample. The ADC 210 may output a plurality of pieces of the current sampling data I-sample to the zero current detection unit 220.

The zero current detection unit 220 detects the phase current zero phase I-$P_0$ at which the phase current IU of the specific coil is zero. The zero current detection unit 220 may detect the phase current zero phase I-$P_0$ using the digital current sampling data I-sample of the specific coil input from the ADC 210.

The motor driver 140 may determine the floating period using the phase current zero phase I-$P_0$ detected by the zero current detection unit 220. The motor driver 140 may float the specific coil in the determined floating period. As an example, the zero current detection unit 220 may provide the phase current zero phase I-$P_0$ to the PWM generation unit 250, and the PWM generation unit 250 may generate a PWM signal to float the specific coil in the floating period in which the phase current zero phase I-$P_0$ is present.

Meanwhile, as illustrated in FIG. 3, the phase voltage of the specific coil may include a high voltage period in which the first power voltage VDD is applied and a low voltage period in which the second power voltage VSS is applied. The floating period may be included in the high voltage period. That is, the motor driver 140 may float the specific coil in a partial period of the high voltage period.

In addition, the floating period may have a phase range having a preset angle. As an example, the angle of the floating period may be 1° or more and 10° or less.

The ADC 210 may convert a voltage sensing signal input in the floating period into digital voltage sampling data V-sample. Referring to FIG. 4, the ADC 210 may sample the voltage sensing signal input in the form of analog at a sampling point S and convert the voltage sensing signal into the digital voltage sampling data V-sample. The ADC 210 may output the digital voltage sampling data V-sample to the back electromotive force voltage determination unit 230.

In one embodiment, the ADC 210 may output one piece of the digital voltage sampling data V-sample for each period of the phase voltage of the specific coil. That is, the number of the sampling points S may be set to one for one period.

In the motor driver 140, as the number of sampling times increases, the floating period may increase. In the motor driver 140, as the floating period increases, a discontinuous operation period of the BLDC motor 110 increases, and thus a torque ripple increases.

In the motor driver 140 according to one embodiment of the present disclosure, the floating period may be decreased by setting a small number of sampling times of the ADC 210 for one period. In the motor driver 140 according to one embodiment of the present disclosure, by setting the number of sampling times of the ADC 210 for one period to one, the floating period can be minimized, and thus the torque ripple can be minimized.

However, the present disclosure is not necessarily limited thereto. In the motor driver 140 according to one embodiment of the present disclosure, the number of sampling times of the ADC 210 for one period may be set to two or three.

The back electromotive force voltage determination unit 230 determines a back electromotive force voltage BEMF of the specific coil on the basis of a plurality of pieces of the digital voltage sampling data V-sample input from the ADC 210.

The back electromotive force voltage determination unit 230 may receive a small number of pieces of the digital voltage sampling data V-sample, for example, one piece, from the ADC 210 for each period. When the back electromotive force voltage BEMF is determined using only the small number of pieces of the sampling data, the back electromotive force voltage BEMF may be sensitive to noise. That is, an inaccurate value may be detected due to noise.

In order to prevent this, the back electromotive force voltage determination unit 230 according to one embodiment of the present disclosure may determine a back electromotive force voltage BEMF on the basis of a plurality of pieces of the digital voltage sampling data V-sample input for N periods.

Referring to FIG. 5, the back electromotive force voltage determination unit 230 may receive one piece of the digital voltage sampling data V-sample for each period. For example, the back electromotive force voltage determination unit 230 may determine the back electromotive force voltage BEMF on the basis of three pieces of the digital voltage sampling data V-sample input for three periods. The three pieces of the digital voltage sampling data V-sample may include first digital voltage sampling data obtained at a first sampling point S1 of a first period, second digital voltage sampling data obtained at a second sampling point S2 of a second period, and third digital voltage sampling data obtained at a third sampling point S3 of a third period. The back electromotive force voltage determination unit 230 may determine the back electromotive force voltage BEMF on the basis of the first to third pieces of the digital voltage sampling data. In this case, the determined back electromotive force voltage BEMF may be used to process a signal of a fourth period which is the period after the third period.

Meanwhile, when fourth digital voltage sampling data obtained at a fourth sampling point S4 of the fourth period is further input to the back electromotive force voltage determination unit 230, the back electromotive force voltage determination unit 230 may determine a back electromotive force voltage BEMF on the basis of the second to fourth pieces of the digital voltage sampling data. In this case, the determined back electromotive force voltage BEMF may be used to process a signal of a fifth period which is the period after the fourth period.

As described above, since the back electromotive force voltage determination unit 230 according to one embodiment of the present disclosure determines a back electromotive force voltage BEMF on the basis of a plurality of pieces of the digital voltage sampling data V-sample for N periods, the back electromotive force voltage determination unit 230 can obtain a value which is accurate and insensitive to noise.

In one embodiment, the back electromotive force voltage determination unit 230 may calculate an average of the plurality of pieces of the digital voltage sampling data V-sample input from the ADC 210 for the N periods and determine that the average is the back electromotive force voltage BEMF.

The back electromotive force voltage determination unit 230 may calculate the back electromotive force voltage BEMF of the specific coil for each period and output the calculated back electromotive force voltage BEMF. The back electromotive force voltage determination unit 230 may calculate a moving average of the plurality of pieces of the digital voltage sampling data V-sample for the N periods. That is, the back electromotive force voltage determination unit 230 may calculate an average of a plurality of pieces of the digital voltage sampling data V-sample input at a corresponding period and N−1 previous periods and output a calculated back electromotive force voltage BEMF. The output back electromotive force voltage BEMF may be used to process a signal of a next period.

The motor driver 140 according to one embodiment of the present disclosure is characterized by obtaining the plurality of pieces of the digital voltage sampling data V-sample using the ADC 210 and detecting the back electromotive force voltage BEMF on the basis of the obtained plurality of pieces of the digital voltage sampling data V-sample.

The motor driver 140 according to one embodiment of the present disclosure may detect the back electromotive force voltage BEMF using only the ADC 210 and the circuit which calculates the average of the plurality of pieces of the digital voltage sampling data V-sample and may not use a comparator. Accordingly, in the motor driver 140 according to one embodiment of the present disclosure, the back electromotive force voltage BEMF detection circuit is simple, and power consumption is low compared to the conventional motor driver.

In addition, in the motor driver 140 according to one embodiment of the present disclosure, the floating period may be decreased by setting the small number of sampling times of the ADC 210 for one period. When the number of sampling times of the ADC 210 is set to one, in the motor driver 140 according to one embodiment of the present disclosure, the floating period can be minimized, and thus a torque ripple can also be minimized.

In addition, in the motor driver 140 according to one embodiment of the present disclosure, even when noise is generated, the effect on the back electromotive force voltage BEMF can be minimized by determining that the average of the plurality of pieces of the digital voltage sampling data V-sample input for the N periods is the back electromotive force voltage BEMF. That is, in the motor driver 140 according to one embodiment of the present disclosure, even when a separate noise cancelling circuit is not provided, the back electromotive force voltage BEMF which is insensitive to noise and accurate can be obtained.

In addition, in the motor driver 140 according to one embodiment of the present disclosure, since the digital voltage sampling data V-sample may be quickly obtained through the ADC 210 unlike a comparator having a limit at a high speed, even when a driving speed of the BLDC motor 110 increases, the back electromotive force voltage BEMF can be quickly and accurately detected.

Meanwhile, the motor driver 140 according to one embodiment of the present disclosure may control the speed of the BLDC motor 110 using the detected back electromotive force voltage BEMF. As an example, the motor driver 140 may control a phase of the back electromotive force voltage BEMF to match a phase of a current in order to improve driving efficiency of the BLDC motor 110. When the phase of the back electromotive force voltage BEMF and the phase of the current do not match, the motor driver 140 may control the phase of the back electromotive force voltage BEMF to match the phase of the current by adjusting the speed of the BLDC motor 110.

In order to control the speed of the BLDC motor 110, the back electromotive force voltage determination unit 230 may provide the determined back electromotive force voltage BEMF to the speed control unit 240.

The speed control unit 240 controls the speed of the BLDC motor 110 to compensate for an error between the back electromotive force voltage BEMF of the specific coil and a reference voltage Vref. Specifically, the speed control unit 240 may control the back electromotive force voltage BEMF of the specific coil to match the reference voltage Vref. In this case, since the back electromotive force voltage BEMF of the specific coil input to the speed control unit 240 corresponds to a value detected at a phase current zero phase I-$P_0$, the motor driver 140 may control the back electromotive force voltage BEMF of the specific coil to match the reference voltage Vref at the phase current zero phase I-$P_0$ of the specific coil through the speed control unit 240.

To this end, the speed control unit 240 may include a subtracter 242, a proportional-integral (PI) control unit 244, and a PWM speed determination unit 246.

The subtracter 242 obtains the error by comparing the reference voltage Vref and the back electromotive force voltage BEMF determined by the back electromotive force voltage determination unit 230. Specifically, the subtracter 242 may calculate the error by subtracting the back electromotive force voltage BEMF of the specific coil input from the back electromotive force voltage determination unit 230 from the reference voltage Vref as in Equation 1 below.

$$\text{error} = V\text{ref} - \text{BEMF} \qquad [\text{Equation 1}]$$

In one embodiment, the reference voltage Vref may be preset and may correspond to half of a first power voltage VDD.

The PI control unit 244 obtains a PI control value PIC by applying PI control using a PI control factor Kpi to the error. In one embodiment, the PI control unit 244 may obtain the PI control value PIC using Equation 2 below.

$$\text{PIC} = Kpi * \text{error} \qquad [\text{Equation 2}]$$

The PWM speed determination unit 246 may determine a PWM duty compensation value CPWMD for compensating for the error on the basis of the PI control value PIC. The PWM speed determination unit 246 may determine the PWM duty compensation value CPWMD to increase or decrease the driving speed of the BLDC motor 110 according to the error.

Specifically, referring to FIG. 6, each of back electromotive force voltages Phase BEMF (1, 2, . . . , and n) detected on the basis of a plurality of pieces of the digital voltage sampling data V-sample obtained at sampling points S of first to $N^{th}$ periods may be different from and lower than the reference voltage Vref at the phase current zero phase I-$P_0$. That is, when the error between each of the back electromotive force voltages Phase BEMF (1, 2, . . . , and n) and the reference voltage Vref is greater than zero, the PWM speed determination unit 246 may determine the PWM duty compensation value CPWMD for decreasing the driving speed of the BLDC motor 110.

When the driving speed of the BLDC motor 110 is decreased to reflect the PWM duty compensation value CPWMD determined by the PWM speed determination unit 246, as illustrated in FIG. 6, a back electromotive force voltage Phase BEMF' (n+1) of an $(N+1)^{th}$ period which is a next period may be changed to be equal to the reference voltage Vref at the phase current zero phase I-$P_0$.

In addition, referring to FIG. 7, each of the back electromotive force voltages Phase BEMF (1, 2, ..., and n) of the specific coil detected on the basis of the plurality of pieces of the digital voltage sampling data V-sample obtained at the sampling point S of the first to $N^{th}$ periods may be different from and higher than the reference voltage Vref at the phase current zero phase I-$P_0$. That is, when the error between each of the back electromotive force voltages Phase BEMF (1, 2, ..., and n) and the reference voltage Vref is less than zero, the PWM speed determination unit 246 may determine the PWM duty compensation value CPWMD for increasing the driving speed of the BLDC motor 110.

When the driving speed of the BLDC motor 110 is increased to reflect the PWM duty compensation value CPWMD determined by the determined PWM speed determination unit 246, as illustrated in FIG. 7, the back electromotive force voltage Phase BEMF'(n+1) of the (N+1) t period which is the next period may be changed to be equal to the reference voltage Vref at the phase current zero phase I-$P_0$.

The PWM speed determination unit 246 may provide the PWM duty compensation value CPWMD to the PWM generation unit 250.

The PWM generation unit 250 may generate a PWM signal on the basis of the PWM duty compensation value CPWMD. The PWM generation unit 250 may determine a final PWM duty by adding the PWM duty compensation value CPWMD to a target PWM duty TPWMD input from a micro controller unit (MCU) 150. The PWM generation unit 250 may generate the PWM signal having the final PWM duty and output the PWM signal to an inverter 120.

Figure 8:
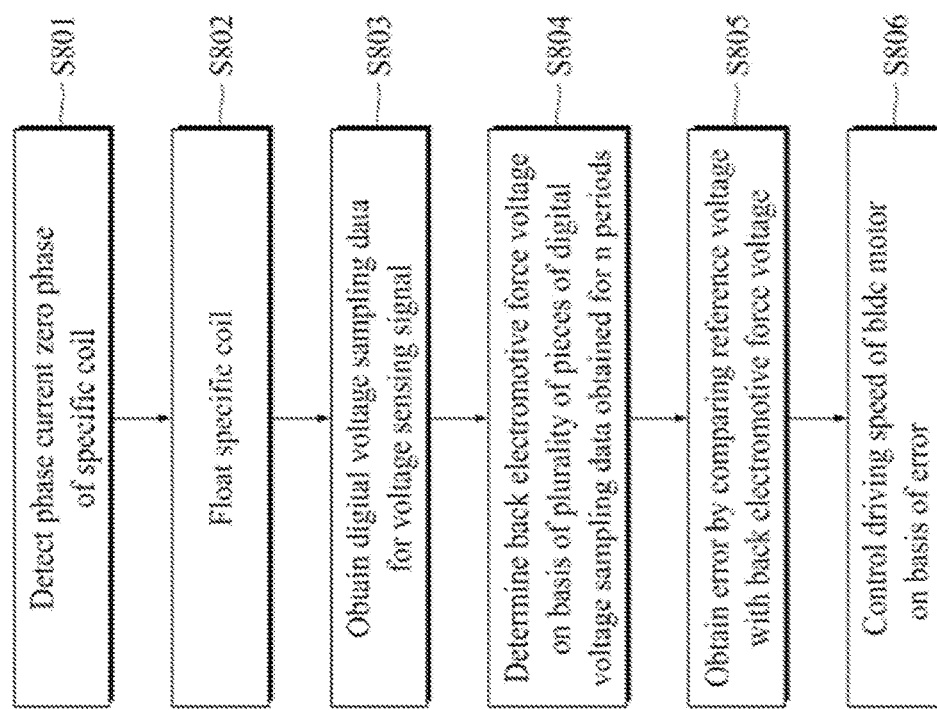
FIG. 8 is a flowchart showing a method of driving a motor of the BLDC motor driving system according to one embodiment of the present disclosure.

FIG. 8 is a flowchart showing a method of driving a motor of the BLDC motor driving system according to one embodiment of the present disclosure.

Referring to FIG. 8, first, the motor driver 140 detects a phase current zero phase I-$P_0$ of any one specific coil among the three phase coils UC, VC, and WC of the BLDC motor 110 (S801).

Specifically, the motor driver 140 may receive a current sensing signal detected at a current IU of any one specific coil among the three phase coils UC, VC, and WC from the inverter 120 through any one of first to third nodes U, V, and W. For example, the motor driver 140 may receive a current sensing signal detected at a phase current IU of the first coil UC through the first node U.

The motor driver 140 may sample the current sensing signal detected at the phase current IU at each of a plurality of sampling points and convert the current sensing signal into digital current sampling data I sample. The motor driver 140 may detect the phase current zero phase I-$P_0$ using a plurality of pieces of the current sampling data I sample.

Then, the motor driver 140 floats the specific coil in a floating period in which the phase current zero phase I-$P_0$ is present (S802).

The motor driver 140 may float the specific coil by outputting all control signals for the specific coil among coil control signals UP, UN, VP, VN, WP, and WN output to the inverter 120 as gate-off voltages. For example, the motor driver 140 may float the first node U and the first coil UC by outputting both 1-1 and 1-2 coil control signals UP and UN as gate-off voltages.

Then, when a voltage sensing signal detected at a phase voltage of the specific coil in the floating period is input to the motor driver 140, the motor driver 140 obtains digital voltage sampling data for the voltage sensing signal (S803).

Specifically, when any one specific coil is floated among the three phase coils UC, VC, and WC, the motor driver 140 may receive a voltage sensing signal detected at a phase voltage VU of the specific coil from the inverter 120 through a specific node among the first to third nodes U, V, and W.

The motor driver 140 may sample a voltage sensing signal input in an analog form at a sampling point in the floating period and convert the voltage sensing signal into digital voltage sampling data V-sample. Although the motor driver 140 may obtain one piece of digital voltage sampling data V-sample for each period of the phase voltage of the specific coil in one embodiment, the present disclosure is not necessarily limited thereto. In another embodiment, the motor driver 140 may obtain two or three pieces of digital voltage sampling data V-sample for each period of the phase voltage of the specific coil.

Then, the motor driver 140 determines a back electromotive force voltage BEMF of the specific coil on the basis of a plurality of pieces of the digital voltage sampling data V-sample input for N periods (S804).

In one embodiment, the motor driver 140 may calculate an average of the plurality of pieces of the digital voltage sampling data V-sample input for the N periods and determine that the calculated average is the back electromotive force voltage BEMF.

In one embodiment, the motor driver 140 may calculate the back electromotive force voltage BEMF of the specific coil for each period and output the calculated back electromotive force voltage BEMF. In this case, the motor driver 140 may calculate a moving average of the plurality of pieces of the digital voltage sampling data V-sample for the N periods.

Then, the motor driver 140 obtains an error by comparing the back electromotive force voltage BEMF of the specific coil with the reference voltage Vref (S805).

Specifically, the motor driver 140 obtains a difference between the reference voltage Vref and the back electromotive force voltage BEMF of the specific coil as the error. In one embodiment, the motor driver 140 may calculate the error by subtracting the back electromotive force voltage BEMF of the specific coil from the reference voltage Vref.

Then, the motor driver 140 controls a driving speed of the BLDC motor 110 on the basis of the error (S806).

When the back electromotive force voltage BEMF of the specific coil is lower than the reference voltage Vref, that is, the error is greater than zero, the motor driver 140 may decrease the driving speed of the BLDC motor 110. However, when the back electromotive force voltage BEMF of the specific coil is higher than the reference voltage Vref, that is, the error is less than zero, the motor driver 140 may increase the driving speed of the BLDC motor 110.

Specifically, the motor driver 140 may obtain a PI control value PIC by applying PI control using a PI control factor Kpi to the error. The motor driver 140 may determine a PWM duty compensation value CPWMD for compensating for the error on the basis of the PI control value PIC.

When the back electromotive force voltage Phase BEMF is lower than the reference voltage Vref and the error is greater than zero, the motor driver 140 may determine the PWM duty compensation value CPWMD for decreasing the driving speed of the BLDC motor 110. However, when the back electromotive force voltage Phase BEMF is higher than the reference voltage Vref and the error is less than zero, the motor driver 140 may determine the PWM duty compensation value CPWMD for increasing the driving speed of the BLDC motor 110.

The motor driver 140 may determine a final PWM duty by adding the PWM duty compensation value CPWMD to a target PWM duty TPWMD input from the MCU 150. In addition, the motor driver 140 may generate a PWM signal having the final PWM duty and output the PWM signal to the inverter 120.

A comparator is not used according to the present disclosure, and a back electromotive force voltage can be detected using only an ADC and a circuit which calculates an average of a plurality of pieces of digital voltage sampling data. Accordingly, a back electromotive force voltage detection circuit according to the present disclosure is simple, and power consumption and a circuit area can be reduced.

In addition, in the present disclosure, a floating period can be decreased by setting the small number of sampling times of the ADC for one period. In the present disclosure, when the number of sampling times of the ADC is set to one, the floating period can be minimized, and thus a torque ripple can also be minimized.

In addition, in the present disclosure, when an average of a plurality of pieces of the digital voltage sampling data obtained for N periods is set as the back electromotive force voltage, the effect of noise can be reduced. In the present disclosure, the back electromotive force voltage which is accurate and insensitive to noise can be obtained even without using a separate noise cancelling circuit.

In addition, in the present disclosure, even when a driving speed of the BLDC motor increases, the back electromotive force voltage can be quickly and accurately detected.

It will be understood by those skilled in the art that the disclosure may be performed in other concrete forms without changing the technological scope and essential features.

Therefore, the above-described embodiments should be considered in a descriptive sense only and not for purposes of limitation. It should be interpreted that the scope of the present disclosure is defined not by the detailed description but by the appended claims, and encompasses all modifications and alterations derived from meanings, the scope, and equivalents of the appended claims.

What is claimed is:

1. A motor driver comprising:
   an analog-to-digital converter (ADC) which, when a voltage sensing signal detected at a phase voltage of a specific coil in a floating period is input, samples the input voltage sensing signal at a sampling point and converts the input voltage sensing signal into digital voltage sampling data; and
   a back electromotive force voltage determination unit which determines a back electromotive force voltage of the specific coil on the basis of a plurality of digital voltage sampling data input for N periods,
   wherein the phase voltage of the specific coil includes a high voltage period and a low voltage period; and
   the high voltage period includes the floating period.

2. The motor driver of claim 1, wherein the ADC outputs one of the plurality of digital voltage sampling data for each period.

3. The motor driver of claim 1, wherein a phase current zero phase in which a current of the specific coil is zero is present in the floating period.

4. The motor driver of claim 1, wherein an angle of the floating period is in the range of 1° to 10°.

5. The motor driver of claim 1, wherein the back electromotive force voltage determination unit includes a back electromotive force voltage calculation unit which calculates an average of the plurality of digital voltage sampling data input for the N periods as the back electromotive force voltage of the specific coil.

6. The motor driver of claim 1, further comprising a speed control unit which controls a driving speed of a brushless direct current (BLDC) motor according to an error between the back electromotive force voltage and a reference voltage.

7. The motor driver of claim 6, wherein:
   when the back electromotive force voltage is higher than the reference voltage, the speed control unit increases the driving speed of the BLDC motor; and
   when the back electromotive force voltage is lower than the reference voltage, the speed control unit decreases the driving speed of the BLDC motor.

8. A method of driving a motor, comprising:
   floating any one specific coil among three phase coils;
   converting, when a voltage sensing signal detected at a phase voltage of the specific coil in a floating period is input, the input voltage sensing signal into digital voltage sampling data by sampling the input voltage sensing signal; and
   determining a back electromotive force voltage of the specific coil on the basis of a plurality of digital voltage sampling data input for N periods,
   wherein the determining of the back electromotive force voltage includes:
      calculating an average of the plurality of digital voltage sampling data input for the N periods; and
      determining that the average is the back electromotive force voltage of the specific coil.

9. The method of claim 8, further comprising detecting a phase current zero phase at which a phase current of the specific coil is zero, wherein the floating period has a phase range in which the phase current zero phase is present.

10. The method of claim 8, wherein the converting of the input voltage sensing signal into the digital voltage sampling data includes:
    sampling the voltage sensing signal at one sampling point for each period;
    converting the voltage sensing signal into one piece of the plurality of digital voltage sampling data; and
    outputting the one piece of the plurality of digital voltage sampling data.

11. The method of claim 8, further comprising:
    obtaining an error between the determined back electromotive force voltage and a reference voltage; and
    controlling a driving speed of a brushless direct current (BLDC) motor so that the error is compensated for.

12. The method of claim 11, wherein the controlling of the driving speed includes:
    increasing the driving speed of the BLDC motor when the back electromotive force voltage is higher than the reference voltage; and
    decreasing the driving speed of the BLDC motor when the back electromotive force voltage is lower than the reference voltage.

13. The method of claim 11, wherein the controlling of the driving speed includes:
    obtaining a proportional-integral (PI) control value by applying PI control using a PI control factor to the error;
    determining a pulse width modulation (PWM) duty for compensating for the error on the basis of the PI control value; and
    controlling the driving speed of the BLDC motor on the basis of a target PWM duty and the determined PWM duty.

14. A electronic device, the electronic device comprising:
a BLDC (brushless direct current) motor;
a motor driver configured to sample a voltage sensing signal at a sampling point and convert the voltage sensing signal into digital voltage sampling data when the voltage sensing signal is detected at a phase voltage of a specific coil in a floating period, wherein the motor driver is further configured to determine a back electromotive force voltage of the specific coil based on a plurality of the digital voltage sampling data input for N periods; and
a controller configured to control a driving speed of the BLDC motor by adjusting a target PWM (pulse with modulation) duty of the motor driver,
wherein the motor driver includes a back electromotive force voltage calculation unit which calculates an average of the plurality of digital voltage sampling data for N periods as the back electromotive force voltage of the specific coil.

15. The electronic device of claim 14, wherein the motor driver is further configured to output one of the plurality of digital voltage sampling data for each period.

16. The electronic device of claim 14, wherein a phase current zero phase in which a current of the specific coil is zero is present in the floating period.

17. The electronic device of claim 14, wherein an angle of the floating period is in the range of 1° to 10°.

* * * * *